2,830,888
PROCESS FOR THE PREPARATION OF TITANIUM AND ZIRCONIUM SUBCHLORIDES

Robert C. Wade, Ipswich, Mass., assignor to National Distillers and Chemical Corporation, New York, N. Y., a corporation of Virginia No Drawing. Application September 21, 1955
Serial No. 535,753

7 Claims. (Cl. 75—1)

This invention relates to a new and useful process for the preparation of the subhalides of titanium and zirconium and more particularly to the preparation of titanium dichloride and trichloride and mixtures thereof and to the preparation of the zirconium subchlorides and mixtures thereof. It also relates to the preparation of such compounds and mixtures thereof using sodium as the reducing reactant with titanium and zirconium tetrachlorides in a reaction medium of dry, solid sodium chloride.

The preparation of titanium dichloride and/or trichloride from the reaction of $TiCl_4$ with hydrogen is difficult to run and yields are poor (10%). The reduction of titanium tetrachloride in a current of hydrogen at 700° C. gives titanium dichloride contaminated with tetrachloride. Anhydrous titanium dichloride has been prepared by decomposing titanium trichloride in a vacuum at 475° C. However, these methods have proved to be unsatisfactory either because of high temperatures, high vacuum requirements or because contaminated mixtures of products are obtained.

This invention has as an object a continuous method of producing titanium subhalide-sodium chloride and zirconium subhalide-sodium chloride mixtures at low temperatures and at atmospheric pressures in high yield.

A further object is to provide a process whereby these subhalides can be prepared without substantial contamination, the only extraneous material being inert salt.

The invention is carried out by reacting titanium tetrachloride with sodium in controlled proportions using finely divided solid sodium chloride as the reaction medium. The reaction, for example, with titanium tetrachloride, is carried out at temperatures above the melting point of sodium but below the melting point of sodium chloride and preferably from 100°. up to about 300° C. to produce a mixture consisting essentially of finely divided sodium chloride and the titanium subchlorides. Thus, the reactions to produce the subhalides from titanium tetrachloride and sodium are as follows:

(1) $TiCl_4 + 2Na \rightarrow TiCl_2 + 2NaCl$
(2) $TiCl_4 + Na \rightarrow TiCl_3 + NaCl$ It is thus possible, by adding controlled amounts of sodium to titanium tetrachloride or zirconium tetrachloride in a reaction medium consisting substantially of sodium chloride, a by-product of the reaction, to produce the corresponding dichlorides, trichlorides, and/or mixtures of these products. The reaction conditions for producing these materials must be carefully controlled in order to obtain these subhalides, as is described hereinafter.

It is also another feature that the preparation of the subhalides can be carried out by initially preparing a finely divided form of titanium by reacting substantially stoichiometric amounts of sodium with titanium tetrachloride in solid finely divided sodium chloride to produce a mixture of finely divided titanium and sodium chloride, and subjecting the resulting reaction mixture to further reaction with titanium tetrachloride or zirconium tetrachloride under controlled and critical conditions to yield the subhalides. For instance, when operating in this manner, the initial reaction is as follows:

(1) $TiCl_4 + 4Na \rightarrow Ti + 4NaCl$

When this very finely divided titanium-sodium chloride mixture is reacted with additional, controlled amounts of titanium tetrachloride preferably in the same equipment and in the same temperature range, titanium subhalide-salt mixtures are obtained according to the following equations:

(2) $Ti + TiCl_4 \rightarrow 2TiCl_2$
(3) $TiCl_2 + TiCl_4 \rightarrow 2TiCl_3$

Zirconium tetrachloride, substituted for titanium tetrachloride in the above reactions reacts similarly to form the corresponding zirconium subhalides in admixture with salt.

Thus, by reacting controlled amounts of sodium and titanium tetrachloride or zirconium tetrachloride in solid sodium chloride reaction medium or alternatively adding controlled amounts of the appropriate tetrachloride to preformed, finely divided Ti:NaCl mixture or Zr:NaCl mixture or to a sodium metal-salt mixture, valuable intermediate halide reduction products of either or both of the metals are readily and economically produced in combination with the by-product salt from which they can be conveniently separated, if desired.

For instance, to finely divided solid sodium chloride, there is added titanium or zirconium tetrachloride and either one or two equivalents of sodium to yield mixtures consisting substantially of $TiCl_3$ and salt, $TiCl_2$ and salt, $ZrCl_3$ and salt, $ZrCl_2$ and salt, and various mixtures thereof. The reaction can be carried out by simultaneous, intermittent or alternate addition of the reactants to the body of reaction mixture. It may be particularly convenient to add small amounts of sodium, which becomes distributed over the solid salt and subsequently reacts with the tetrachloride. Since the sodium is a liquid at the reaction temperatures, it spreads readily over the surfaces of the finely divided sodium chloride and facilitates reaction with the tetrachloride.

It is of importance to maintain a deficiency of sodium at all times during this operation in order to assure a minimal production of completely reduced products. Under no circumstances are stoichiometric amounts of the tetrachlorides and sodium reacted to give substantially complete reduction.

Also for example, to a finely divided mixture of Ti and/or Zr and NaCl, there is added either one or two equivalents of titanium or zirconium tetrachlorides and, by reaction therewith, there is obtained mixtures of $TiCl_2$ and $TiCl_3$ with salt, mixtures of $ZrCl_2$ and $ZrCl_3$ with salt, or mixtures of $TiCl_2$ and $ZrCl_2$ or $TiCl_3$ and $ZrCl_3$ with salt.

Although it is possible by properly controlled conditions to produce by the foregoing described methods $TiCl_2$, which is substantially free from $TiCl_3$ and $TiCl_4$ as well as free Ti, this is unnecessary since for many uses a $TiCl_2$ product containing relatively small proportions of these products is quite useful. Likewise, it is possible by properly controlled conditions to produce $TiCl_3$ which is substantially free from $TiCl_2$ and $TiCl_4$ and free Ti, although such a pure product is entirely unnecessary for many purposes.

One convenient method for making a mixture of titanium and zirconium trichlorides, for instance, is carried out in the following manner. One equivalent of titanium tetrachloride is subjected to low temperature reduction with sodium metal to obtain a finely divided solid mixture of approximately 17% titanium metal and 83% salt.

To this there is added three equivalents of zirconium tetrachloride which is reduced to the trichloride by the titanium metal in the finely divided mixture; meanwhile, the titanium metal itself is simultaneously oxidized to the trichloride. Thus the final product is a mixture corresponding to three equivalents of zirconium trichloride and one equivalent of titanium trichloride together with salt.

Similarly, one equivalent of titanium tetrachloride is reduced at low temperature to obtain the finely divided solid titanium and salt mixture to which is added one equivalent of zirconium tetrachloride. The zirconium tetrachloride is reduced to zirconium dichloride at the same time as the titanium is oxidized to titanium dichloride. The final product is a mixture corresponding to an equimolar mixture of the two metal dichlorides together with by-product salt.

In these processes it is preferable to provide agitation of the mixture during the reaction period. This can be done by use of stirring or by use of a reacting device such as a ball mill or pebble mill.

It is believed that the titanium and zirconium subhalides when in the presence of salt may exist at least partially as complexes and/or as double salts therewith from which the total amounts of titanium subhalides cannot be directly isolated. However, it is not necessary to separate the titanium subchlorides from the by-product salt for most uses. Titanium trichloride or dichloride can be separated from salt by dissolving it in 20% solution of HCl and filtering to remove the insoluble sodium chloride. The resulting solution may be concentrated by vacuum evaporation of the aqueous HCl.

Both titanium dichloride and titanium trichloride are powerful reducing agents in aqueous solution and the by-product salt generally does not interfere. For instance, they can be used to reduce acetylenic carbinols to the corresponding hydrocarbons, and to reduce aromatic nitro-compounds to the amines. These reducing agents will reduce unsaturated carbon to carbon bonds to form the corresponding saturated compounds.

For this purpose, if desired, these intermediate subchlorides may be produced as described above in the same vessel in which they are to be used for reductions of organic compounds or for other, further reactions. It is not necessary to separate the salt since it acts as an inert carrier or support for the active reagent and can readily be separated from the products upon completion of the reaction.

It is also possible to use the subhalides and mixtures thereof with salt for further reactions. For example, such mixtures can be conveniently further treated for production of metallic titanium or zirconium or mixtures of these two metals with subsequent recovery of the salt.

The invention may be illustrated in further detail by the following examples, although it is intended in no way to limit the invention specifically thereto. All parts are by weight unless otherwise specified.

EXAMPLE 1

24 parts of sodium are dispersed over 207 parts of finely divided solid sodium chloride in a stirred reactor. The reactor is maintained under a blanket of inert gas. The stirrer is started and there is slowly and continuously added thereto 96 parts of titanium tetrachloride. The reactor and its contents are maintained and controlled at temperatures of 290–330° C. When the addition of this amount of titanium tetrachloride is completed, sufficient titanium tetrachloride has been reacted to form titanium dichloride. A light gray powder is obtained as product which analyzes as a mixture substantially consisting of titanium dichloride and salt.

EXAMPLE 2

23 parts of sodium are dispersed over 207 parts of finely divided solid sodium chloride in a stirred reactor, which is maintained under a blanket of inert gas. Agitation is initiated and there is slowly and continuously added thereto about 190 parts of titanium tetrachloride. The reactor and its contents are maintained at temperatures of 200–400° C. When the addition of this amount of titanium tetrachloride is completed the reaction is stopped and a black powder recovered as product. This product analyzes as a mixture consisting substantially of titanium trichloride and salt.

EXAMPLE 3

There is introduced into a stirred, closed reactor a titanium chloride, preferably titanium tetrachloride. There is also introduced into the reactor, sodium metal preferably in liquid phase. These reactants are introduced continuously and simultaneously or at least semi-intermittently. The reactor is surrounded by a heating jacket to which a liquid heat transfer medium may be introduced for temperature control. The contents of the reactor may be withdrawn as desired by suitable outlets. Provision should be made for maintaining a blanket of inert gas above the reactor contents.

In operating the process, the reactor is initially charged with dry solid sodium chloride, preferably in finely divided form. This sodium chloride has preferably been subdivided such as between 80 and 100 mesh, although the exact size and amount is not critical since the sodium chloride initially charged will be replaced, during operation, by that formed in the process. Alternatively, a portion of the finely divided titanium metal and sodium chloride mixture produced as a result of previous reaction may be reserved and used as the reaction mixture for subsequent operations.

The amount charged will normally be somewhat less than will maintain the operating level when the reactor is in a state of turbulent agitation. After charging the reactor, the mixer is started and an inert gas, for example, argon, or helium, is introduced, and maintained throughout the reaction period.

The sodium and titanium tetrachloride are initially supplied in substantially stoichiometric proportions for the complete reduction of the titanium tetrachloride to titanium metal and sodium chloride, that is, four moles of sodium for each mole of titanium tetrachloride undergoing reduction. Under these conditions the sodium immediately forms a surface film on the solid sodium chloride and reacts quantitatively with the titanium chloride, thus liberating solid titanium metal in admixture with the mass of solid sodium chloride and forming the titanium in a state of extremely fine subdivision, probably of the order of 50 millimicrons. Using titanium tetrachloride, the composition of the charge in the reactor will eventually approach the stoichiometric ratio of Ti:4NaCl or 17% Ti.

As soon as the reaction starts, a cooling fluid is circulated through the jacket to carry away the reaction heat or the temperature is otherwise controlled to keep the temperature below 300° C. and preferably below 200° C.

Finely divided solid titanium-salt mixture is thus prepared. By using Ti–NaCl mixtures from previous experiments as a carrier for sodium as described above, it is easily possible to obtain mixtures which contain 17% Ti–83% NaCl which is the weight composition of the stoichiometric ratio of 1Ti–4NaCl. This Ti–NaCl mixture is an excellent carrier for sodium and permits having the maximum concentration of titanium present at all times.

100 parts of the 17% Ti–83% salt mixture are transferred to a stirred reactor under an argon or helium atmosphere. The stirrer is started to provide a tumbling type of agitation. The reactor and contents are heated to 150° C. Then 67.3 parts of titanium tetrachloride are added to the stirred titanium salt mixture in a dropwise manner. The reaction is strongly exothermic. When the addition of this amount of titanium tetrachloride is completed, sufficient titanium tetrachloride has been reacted to convert all of the titanium metal to titanium dichloride. Without isolating this product, another 134.7 parts of titanium tetrachloride is added to the stirred mixture at 150–250° C. Again the titanium tetrachloride reacts exothermally and completely. The resulting mixture now contains 72.5% titanium trichloride and 27.5% sodium chloride. A sample of this product is dissolved in 20% hydrochloric acid. The violet colored solution is titrated with ferric ion by standard procedures. The analysis indicates that the starting mixture contains 66% titanium trichloride or 91% yield based on the original titanium present.

EXAMPLE 4

125 parts of the mixture of titanium trichloride and salt obtained as described in Example 3 is charged to a reactor under helium. The flask and contents are heated to 130° C. with stirring. Then 7.26 parts of sodium are added. This sodium spreads over the mixture and reacts with the titanium trichloride to reduce it. Then 61.35 parts of titanium tetrachloride are added. The temperature rises to 150° C. Ten successive alternate additions of sodium and titanium tetrachloride are made. The final product contains 67% titanium trichloride or 92% of theory.

EXAMPLE 5

200 parts of the 17% Ti–83% NaCl mixture prepared as described in Example 3 are placed in a reactor. This is reacted with 135 parts of TiCl$_4$ at 250–275° C. as described in the previous examples. The end product theoretically contains 50% TiCl$_2$ and 50% NaCl. When a sample of this material is reacted with water, hydrogen is evolved according to the reaction:

$$TiCl_2 + H_2O \rightarrow TiOCl_2 + H_2\uparrow$$

The amount of hydrogen evolved from a measured sample indicates that the conversion of titanium to titanium dichloride is 95% of theory. The titanium dichloride-salt mixture is a light grey color.

EXAMPLE 6

Table 1 attached shows further specific data obtained from a series of runs in which either TiCl$_3$ or TiCl$_2$ were made by reduction of TiCl$_4$ under the conditions as shown.

*Table 1*

TITANIUM DICHLORIDE

| Expt. No. | Reactor | Carrier Parts | Carrier Material | Sodium, parts | TiCl$_4$, parts | Reaction Temp., °C. | Product Appearance |
|---|---|---|---|---|---|---|---|
| 1 | G. R.[1] | 207 | NaCl | 24 | 96 | 290–330 | Light Gray, Sintered. |
| 2 | B. M.[2] | 100 | Ti–NaCl | 16.9 Ti | 67.3 | 248–294 | Fused. |
| 3 | B. M.[2] | 200 | Ti–NaCl | 33.8 Ti | 135 | 250–274 | Light Gray, Lumpy. |

TITANIUM TRICHLORIDE

| | | | | | | | |
|---|---|---|---|---|---|---|---|
| 4 | G. R.[1] | 207 | NaCl | 23 | 190 | 200–400 | Black Powder. |
| 5 | B. M.[2] | 100 | Ti–NaCl | 16.9 Ti | 202 | 365–375 | Do. |
| 6 | B. M.[2] | 100 | Ti–NaCl | 16.9 Ti | 202 | 300–400 | Do. |
| 7 | G. R.[1] | 100 | Ti–NaCl | 16.8 Ti | 202 | 240–277 | Do. |
| 8 | G. R.[1] | 100 | Ti–NaCl | 16.8 Ti | 202 | 250–288 | Do. |

[1] G. R. indicates glass reactor.
[2] B. M. indicates ball mill.

What is claimed is:

1. A process for production of subchlorides of a metal selected from the group consisting of titanium and zirconium which comprises adding to an agitated, dry, solid, finely divided reaction bed comprising sodium chloride, one to three equivalents of sodium and one equivalent of a metal tetrachloride selected from the group consisting of titanium tetrachloride and zirconium tetrachloride, these being the sole ingredients added to the bed, and maintaining a reaction temperature within the range between the melting point of sodium and the melting point of sodium chloride.

2. The process of claim 1 wherein said metal subchlorides are titanium subchlorides and said metal tetrachloride is titanium tetrachloride.

3. The process of claim 1 wherein said metal subchlorides are zirconium subchlorides and said metal tetrachloride is zirconium tetrachloride.

4. The process of claim 1 wherein said reaction bed contains subchlorides of a metal selected from the group consisting of titanium and zirconium.

5. A process for continuous production of subchlorides of a metal selected from the group consisting of titanium and zirconium which comprises continuously adding to an agitated dry, solid, finely divided reaction bed comprising sodium chloride, one to three equivalents of sodium and one equivalent of a metal tetrachloride selected from the group consisting of titanium tetrachloride and zirconium tetrachloride, these being the sole ingredients added to the bed, maintaining a reaction temperature within the range between the melting point of sodium and the melting point of sodium chloride, and continuously recovering said metal subchlorides admixed with sodium chloride.

6. The process of claim 5 wherein said metal subchlorides are titanium subchlorides and said metal tetrachloride is titanium tetrachloride.

7. The process of claim 5 wherein said metal subchlorides are zirconium subchlorides and said metal tetrachloride is zirconium tetrachloride.

References Cited in the file of this patent

UNITED STATES PATENTS

| 2,618,550 | Hampsel et al. | Nov. 18, 1952 |
| 2,703,752 | Glasser et al. | Mar. 8, 1955 |
| 2,765,270 | Brenner | Oct. 2, 1956 |

FOREIGN PATENTS

| 717,930 | Great Britain | Nov. 3, 1954 |